United States Patent [19]
Iga

[11] Patent Number: 5,265,706
[45] Date of Patent: Nov. 30, 1993

[54] OVERRUNNING CLUTCH SYSTEM

[75] Inventor: Kazuo Iga, Yamatotakada, Japan

[73] Assignee: Koyo Seiko Co., Ltd., Osaka, Japan

[21] Appl. No.: 961,858

[22] Filed: Oct. 16, 1992

[30] Foreign Application Priority Data

Jan. 24, 1992 [JP] Japan .................................. 4-11024

[51] Int. Cl.5 ............................................. F16D 41/06
[52] U.S. Cl. ........................................ 192/42; 192/45
[58] Field of Search .................. 192/42, 45, 110 R, 63

[56] References Cited

U.S. PATENT DOCUMENTS

| 1,375,576 | 4/1921 | Duca . | |
|---|---|---|---|
| 3,691,854 | 9/1972 | Barthruff et al. . | |
| 4,566,567 | 1/1986 | Miyatake . | |
| 4,753,330 | 6/1988 | Ohzono et al. . | |
| 4,883,152 | 11/1989 | Froment . | |
| 4,901,832 | 2/1990 | Werner . | |
| 4,986,140 | 1/1991 | Morishita et al. . | |
| 5,117,954 | 6/1992 | Iga . | |
| 5,119,919 | 6/1992 | Iga | 192/45 |
| 5,159,845 | 11/1992 | Wada et al. | 192/42 X |

FOREIGN PATENT DOCUMENTS

| 2710608 | 9/1978 | Fed. Rep. of Germany . |
|---|---|---|
| 2517001 | 5/1983 | France . |
| 2085970 | 5/1982 | United Kingdom . |

Primary Examiner—Richard M. Lorence
Attorney, Agent, or Firm—Birch, Stewart, Kolasch & Birch

[57] ABSTRACT

Cam surfaces are formed in the inner periphery of a cylindrical body of a shell. Rollers are moved against action of springs in the lock direction in which the space between the cam surfaces and a drive shaft becomes narrower, whereby the shell and the drive shaft are locked to transmit power from the drive shaft to a driven shaft. After transmission of the power, the rollers are radially and outwardly pressed against the inner periphery of the cam surfaces in the unlock direction in which the space between the cam surfaces and the drive shaft is wider, by co-action of a centrifugal force and a component force, thus a "dancing phenomenon" is prevented. A flange of the shell is spline-engaged with the driven shaft, an annular abutment plate in the inner periphery of the flange is held between a step of the driven shaft by an axially movable sleeve fitted around the small diameter portion of the driven shaft and the drive shaft without an axially loose condition by a fixing member.

6 Claims, 5 Drawing Sheets

OVERRUNNING CLUTCH SYSTEM

BACKGROUND OF THE INVENTION

1. Field of the Invention

The present invention relates to an overrunning clutch system, and more particularly to an overrunning clutch system, for example, suitable for the engine starter used for an agricultural machine such as a lawn mower, a sprayer or the like.

2. Description of Related Art

Referring now specifically to FIG. 4, illustrating a prior art overrunning clutch system, there is provided a starter motor 52 having an output shaft on which a drive gear 54 is mounted. An idle gearing 56 has a large gear 56a and a small gear 56b, which are respectively meshed with the drive gear 54 and a reduction gear 58.

The reduction gear 58 is fixedly mounted on a drive shaft or cylindrical transmission sleeve 60 coaxially fitted around an overrunning clutch 64 which has a shell type construction and is disposed between the transmission sleeve 60 and the crankshaft 62.

With this arrangement, drive power is transmitted from the starter motor 52 to the transmission sleeve 60 with the speed of rotation being reduced through the gears.

As shown in FIGS. 5 and 6, the overrunning clutch 64 includes a shell 66, a retainer 68, and a plurality of rollers 70. The shell 66 has a cylindrical portion 66a and a pair of flanges 66b extending radially and inwardly from the axial opposite ends of the cylindrical portion 66a.

Cam surfaces 66c corresponding in number to the rollers 70 are formed in the inner periphery of the cylindrical portion 66a. The retainer 68 is made of a synthetic resin and includes a pair of opposite annular rings 68a, and a plurality of column portions 68b extending axially between these rings 68a. A plurality of roller pockets 68c are defined between adjacent column portions 68b, wherein the rollers 70 are correspondingly rollingly disposed. Each of the column portions 68b in the retainer 68 has an integral spring 68d which takes the shape of a bifurcated tongue adapted to urge the roller 70 in the roller pocket 68b in the direction that the roller 70 is locked between the cam surface 66c and the crankshaft 62. The shell 66 of the overrunning clutch 64 thus constructed is pressed in the transmission sleeve 60.

The operation of the above-mentioned overrunning clutch system is as follows.

To crank up an engine, not shown, when the starter motor 52 is energized to rotate the sleeve 60 in the direction of an arrow a2 through each of the gears 54, 56, and 58, the shell 66 and the retainer 68 are rotated in the same direction. The rollers 70 urged by the springs 68d are then moved in the direction that the space between the cam surfaces 66c and the crankshaft 62 is narrower, and the cam surfaces 66c and the crankshaft 62 are finally locked.

In this manner, the rotation of the shell 66 is transmitted through the rollers 70 to the crankshaft 62, such that the crankshaft 62 is rotated in the direction of an arrow b2 so as to crank up the engine connected thereto.

When the engine is thus cranked up, the starter motor 52 is stopped, while the crankshaft 62 is rotated at a high speed in the direction of the arrow b2 by means of the engine. At this time, the transmission sleeve 60 is stopped since it is connected through the reduction gear 58, the idle gearing 56, and the drive gear 54 to the starter motor 52. Hence the shell 66 and the retainer 68 secured respectively to the transmission sleeve 60 are also stopped.

In such a state, by frictional force applied from the crankshaft 62 to the rollers 70, the rollers 70 are pushed against the springs 68d in the direction of the arrow b2 in which the space between the cam surfaces 66c and the crankshaft 62 is wider, whereby the rollers 70 are enabled to freely rotate within the roller pockets 68c, thereby causing the cam surfaces 66c and the crankshaft 62 to be unlocked, so that power is no longer transmitted from the crankshaft 62 to the shell 66 and finally the starter motor 52.

It has been stated that when the crankshaft 62 is rotated by the engine, the rollers 70 are moved in the direction in which the space between the cam surfaces 66c and the crankshaft 62 is wider.

Actually, although the rollers 70 are moved in the direction of the wide space between the cam surfaces 66c and the crankshaft 62 so as to race immediately after they come into contact with the crankshaft 62, they are moved in the direction of the narrow space therebetween by the action of springs 68d as soon as a push force from the crankshaft 62 is no longer applied, thereby being brought into contact with the crankshaft 62.

Such an intermittent movement in which the rollers 70 are contacted with and separated from the crankshaft 62, is so-called a "dancing phenomenon" of the rollers 70. When the rollers 70 in the phenomenon are moved in such a direction as to lock the cam surfaces 66 and the crankshaft 62, they become worn and heated by means of the frictional force applied from the crankshaft 62, such that the crankshaft 20 is prevented from smoothly rotating. Further, friction between the rollers 70 and the crankshaft 62 generates heat, thereby resulting in an increase in the temperature of the parts comprising the rollers 70, the crankshaft 62, and the retainer 68, and when the temperature is raised above the predetermined level, seizing of the parts may occur.

If seizing occurs, the crankshaft 62 and the shell 66 are locked to give an impact or to cause damage to the overrunning clutch system. The retainer 68 is easily damaged due to the frictional heat, particularly in the case where the retainer 68 with a tongue-like spring 68d is made of a synthetic resin.

Furthermore, to hold the rollers 70 in the wide space so that they are not moved in the direction of the narrow space between the cam surfaces 66c and the crankshaft 62 against the biasing force of the springs 68d and thus to suppress the generation of the above frictional heat wherever possible, it is considered that the springs 68d be formed to have a smaller biasing force.

With the springs 68d having the smaller biasing force, however, it is difficult for the rollers 70 to firmly lock between the cam surface 66c and the crankshaft 22 so as to transmit rotation from the sleeve 60 to the crankshaft 62 when the engine is started up.

FIG. 7 is a longitudinal sectional side view of an overrunning clutch system proposed by U.S. Pat. No. 5,117,954 corresponding to Japanese Application Number 2-207383, filed on Jul. 30, 1991, to solve the above "dancing phenomenon" of the rollers 70. In FIG. 7, the same reference numerals are provided for the elements corresponding to those in the overrunning clutch system shown in FIGS. 4 through 6. The overrunning clutch system of FIG. 7 basically includes a starter motor 52, a drive gear 54, an idle gearing 56, a reduction gear 58, a crankshaft 62, an overrunning clutch 64, a shell 66, a retainer 68, and a plurality of rollers 70.

The crankshaft 62 has a large diameter portion 62a, a small diameter portion 62b, and an attaching portion or threaded portion 62c. One flange 66b at the left side of the shell 66 is extended radially and inwardly, being spline-engaged with a crankshaft 62. An annular abutment plate 72 is held in the inner side of the flange 66b and pressed against a step 62c formed with the one end surface of the large diameter portion 62a of the crankshaft 62.

A C-shaped ring 74 is mounted adjacent the annular abutment plate 72 in an annular groove 62d formed with the one end surface of the small diameter portion 62b.

With this arrangement, when the starter motor 52 is driven, the crankshaft 62 is rotated so as to start up the engine in the same manner as in the above system of FIGS. 4 to 6, such that the rollers 70 are moved in the direction where the space between cam surfaces (not shown) and the crankshaft 62 is wider, and thereafter is left under a freely racing state in the wide space. The freely racing rollers 70 in the wide space are forced radially and outwardly by centrifugal force.

After being moved in the wide space direction in the overrunning clutch 64, the rollers 70 are not moved by the action of springs (not shown) in the direction where the space between the cam surfaces and the crankshaft 62 is narrower, which results in that the "dancing phenomenon" of the rollers 70 is not caused.

In the overrunning clutch system shown in FIG. 7, however, since the C-shaped ring 74 is set to be a smaller axial width than the annular groove 62d on one end surface of the small diameter portion 62b, they become loose radially between the annular abutment plate 72 and the small diameter portion 62b. Such an axial looseness of the C-shaped ring 74 may cause skew of the rollers 70 and hence make the function of the overrunning clutch 64 very unstable.

Furthermore, since the outer periphery of the small diameter portion 62b of the crankshaft 62 functions as a guideway for the transmission sleeve 62, expensive laborous replacement of the entire crankshaft 62 may be required if the outer periphery thereof is damaged.

SUMMARY OF THE INVENTION

Accordingly, it is an object of the present invention to provide an overrunning clutch system which can effectively prevent a "dancing phenomenon" of rollers by firmly holding the rollers in such a position that they are free to race.

Another object of the present invention is to provide an overrunning clutch system wherein an overrunning clutch can be mounted on a driven shaft without an axially loose condition.

A further object of the present invention is to provide an overrunning clutch system wherein a driven shaft can be easily and inexpensively replaced even if the outer periphery thereof is damaged.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In order to acheive these objects, in accordance with the present invention, an overrunning clutch system comprises a driven shaft including a large diameter portion, a small diameter portion, and an attaching portion, the large diameter portion having a step formed on the end surface thereof; a hollow drive shaft fitted around the small diameter portion of the driven shaft; and overrunning clutch for transmitting power from the drive shaft to the driven shaft, the overrunning clutch including a shell, a retainer, a plurality of rollers, springs, and an annular abutment plate, the shell including a cylindrical portion on the inner periphery of which cam surfaces are formed so that the space between the cam surfaces and the driven shaft is narrower in a lock direction and wider in an unlock direction, and a flange radially and inwardly extended from one end thereof and engaged with the large diameter portion of the driven shaft, the retainer being held in the inner periphery of the cylindrical portion of the shell and having roller pockets corresponding in number to the cam surfaces, the rollers being disposed within the corresponding roller pockets to lock the the cylindrical portion and drive shaft when the rollers are moved in the lock direction and to freely race within the roller pockets when the rollers are moved in the unlock direction, the springs being disposed within the roller pockets for urging the rollers in the lock direction, the annular abutment plate being disposed between the inner periphery of the cylindrical portion of the shell and the one end surface of the retainer; an axially movable sleeve fitted around the small diameter portion of the driven shaft; and a fixing member mounted on the attaching portion of the driven shaft to press the sleeve toward the step on the large diameter portion of the driven shaft and to hold the annular abutment plate between the one end surface of the sleeve and the step.

With this arrangement, after the driven shaft has been rotated by power transmitted from the drive shaft, each of the rollers of the overrunning clutch rotating together with the driven shaft, is axially and outwardly pressed in the place where the space between the cam surfaces and the drive shaft is wider. As a result, each of the rollers of the overrunning clutch is no longer in contact with the drive shaft and hence the "dancing phenomenon" of the rollers does not occur.

Further, since the overrunning clutch is mounted on the driven shaft so that the flange of the shell is splined to the driven shaft and the annular abutment plate is placed between the step of the driven shaft and the one end surface of the sleeve, an axially loose condition of the overrunning clutch is eliminated.

Furthermore, since the sleeve adapted to axially position the overrunning clutch is provided as a raceway for the inner roller of the roller bearing disposed between the drive shaft and the small diameter portion of the driven shaft, it is possible to accurately machine the driven shaft as compared with the case where the outer periphery of the small diameter portion of the driven shaft is employed as the raceway for the inner roller of the roller bearing. Easy replacement of the driven shaft having the damaged outer periphery is made possible.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a longitudinal sectional side view of an overrunning clutch system;

FIG. 2 is a longitudinal sectional side view of the overrunning clutch taken along line 2—2 of FIG. 1;

FIG. 3 is an enlarged side view, in longitudinal section, of the principal part of the overrunning clutch in use;

FIG. 4 is a longitudinal sectional side view of a conventional overrunning clutch system;

FIG. 5 is a longitudinal sectional side view of the overrunning clutch of the FIG. 4;

FIG. 6 is a sectional view taken along line 6—6 of FIG. 5; and

DESCRIPTION OF THE PREFERRED EMBODIMENT

The present invention will now be described, by way of example, with reference to the accompanying drawings.

Figure 1:
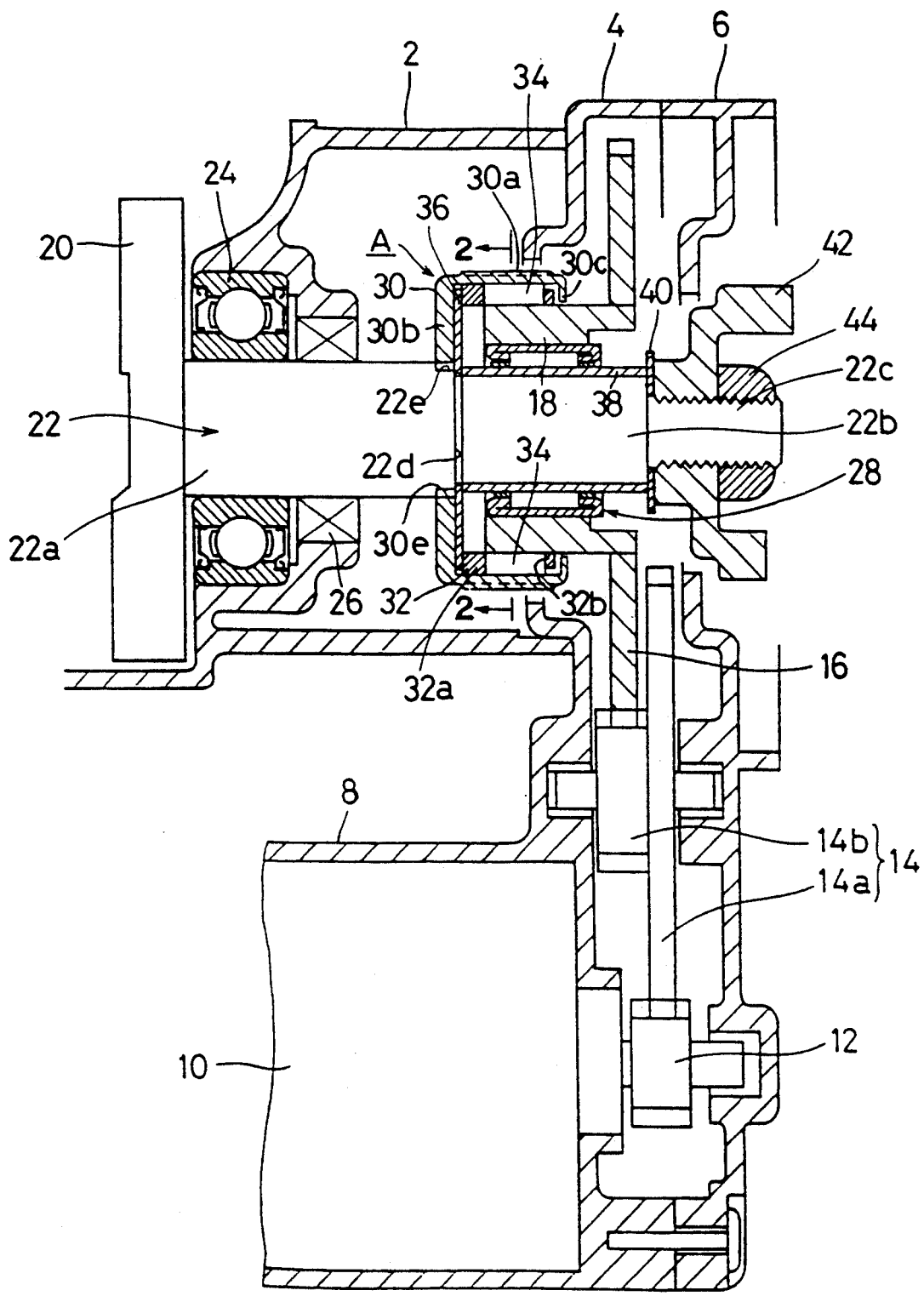
FIGS. 1 to 3 illustrate one embodiment of the present invention.

FIG. 1 is a longitudinal sectional view of an overrunning clutch system for use, for example, in the engine starter of an agricultural machine such as a lawn mower or sprayer.

Figure 2:
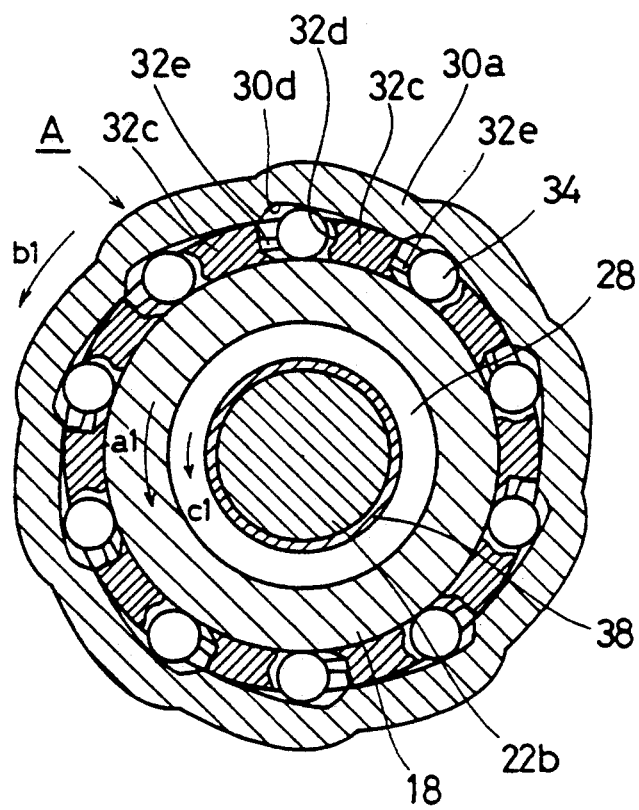

FIG. 2 is a longitudinal sectional side view of an overrunning clutch taken along line 2—2 of FIG. 1.

Referring to FIG. 1, an engine casing 2, gear casings 4 and 6, and a motor housing 8 are provided. A starter motor 10 has a drive gear 12 secured to the output shaft thereof. An idle gearing 14 is composed of a large gear 14a and a small gear 14b integral with the large gear 14a. A reduction gear 16 is secured to a drive shaft or cylindrical transmission sleeve 18. The large gear 14a and the small gear 14b are meshed with the drive gear 12 and the reduction gear 16, respectively. Drive power is transmitted from the starter motor 10 to the transmission sleeve 18 with the speed of rotation of the starter motor 10 being reduced through these gears.

A crank 20, a driven shaft or crankshaft 22, and a ball bearing 24 are provided. Through the ball bearing 24, the crankshaft 22 is rotatably supported within the engine casing 2. Numeral 26 is a bearing seal. The crankshaft 22 has a large diameter portion 22a, a small diameter portion 22b, and an attaching portion or threaded portion 22c, which are axially arranged in this sequence. The large diameter portion 22a has a step 22d on one end surface corresponding to a difference in radial size between both portions 22a and 22b. The large diameter portion 22a of the crankshaft 22 has annular splines 22e extending axially a predetermined length from the step 22d toward the crank 20. The transmission sleeve 18 is rotatably supported through a needle roller bearing 28 on the small diameter portion 22b. A metal sleeve 38 is disposed between the small diameter portion 22b and the roller bearing 28 so as to function as an inner ring of the roller bearing 28.

To transmit power from the transmission sleeve 18 to the crankshaft 22, a one-way or overrunning clutch A includes a cylindrical shell 30, a retainer 32, a plurality of rollers 34, and an annular abutment plate 36. The shell 30 has a cylindrical portion 30a, and thick and thin flanges 30b and 30c each extending radially and inwardly from the opposite ends of the cylindrical portion 30a. Cam surfaces 30d are formed in the inner periphery of the cylindrical portion 30a and correspond in number to the rollers 34. The thick flange 30b is extended radially and inwardly longer than the thin flange 30c, and has splines 30e in its inner periphery for engagement with the axial splines 22d of the large diameter portion 22a of the crankshaft 22. The retainer 32 is made of a synthetic resin and includes a pair of opposite annular rings 32a and 32b, a plurality of column portions 32c extending between the annular rings 32a and 32b, a plurality of roller pockets 32d defined between adjacent column portions 32c to rollingly support the rollers therein, and a plurality of springs 32e, in the form of bifurcated-tongue, adapted to urge the rollers 34 within the roller pockets 32d in the direction in which the space between the cam surfaces 30d and the crankshaft 22 is narrower.

The retainer 32 is non-rotatably fitted within the cylindrical portion 30a of the shell 30. The annular abutment plate 36 is supported between the annular rings 32a of the retainer 32 and the thick flange 30b of the shell 30. In the overrunning clutch A, the thick flange 30b of the shell 30 is fitted around the large diameter portion 22a of the crankshaft 22 with the splines 30e being engaged with the axial splines 22e.

The annular abutment plate 36 is fitted around the crankshaft 22 by being sandwiched between the sleeve 38 and the step 22d of the crankshaft 22. A wing nut 42 and a locking nut 44 as fixing members are respectively screwed in the threaded portion 22c of the crankshaft 22 through a washer. The sandwiched state of the annular abutment plate 36 between the sleeve 38 and the step 22d, is determined in accordance with the screwed amount of the locking nut 44. With this arrangement, the overrunning clutch A is secured to the crankshaft 22 without an axially loose condition.

The operation of the overrunning clutch system thus constructed is as follows.

To start up an engine, the starter motor 10 is energized to rotate the sleeve 18 in the direction of an arrow a1 through the drive gear 12, the idle gearing 14 and the reduction gear 16. Then, the rollers 34 are moved and locked within the roller pockets 32d in the direction in which the space between the cam surfaces 30d and the transmission sleeve 18 is narrower.

This causes transmission of rotation from the transmission sleeve 18 to the shell 30 through the rollers 34, such that the shell 30 is moved in the direction of an arrow b1. As the splines 30e of the thick flange 30b of the shell 30 are engaged with the axial splines 22e of the large diameter portion 22a of the crankshaft 22, rotation of the shell 30 is transmitted to the crankshaft 22. The crankshaft 22 is then rotated in the direction of an arrow c1 so as to start up the engine. At this time, the retainer 32, the rollers 34, the annular abutment plate 36, and the transmission sleeve 18 are all rotated together.

The starter motor 10 is stopped after the engine has been started, the crankshaft 22 being rotated at a high speed in the direction of the arrow c1. In this case, although the overrunning clutch A is also rotated in the same direction as the crankshaft 22, the overrunning clutch A is placed in the free state under which the rollers 34 are moved in the direction in which the space between the cam surfaces 30d and the transmission sleeve 18 is wider, such that the transmission sleeve 18 is no longer rotated. Power is therefore not transmitted from the shell 30 being rotated at a high speed together with the crankshaft 22 to the transmission sleeve 18, and thus the starter motor 10.

Figure 3:
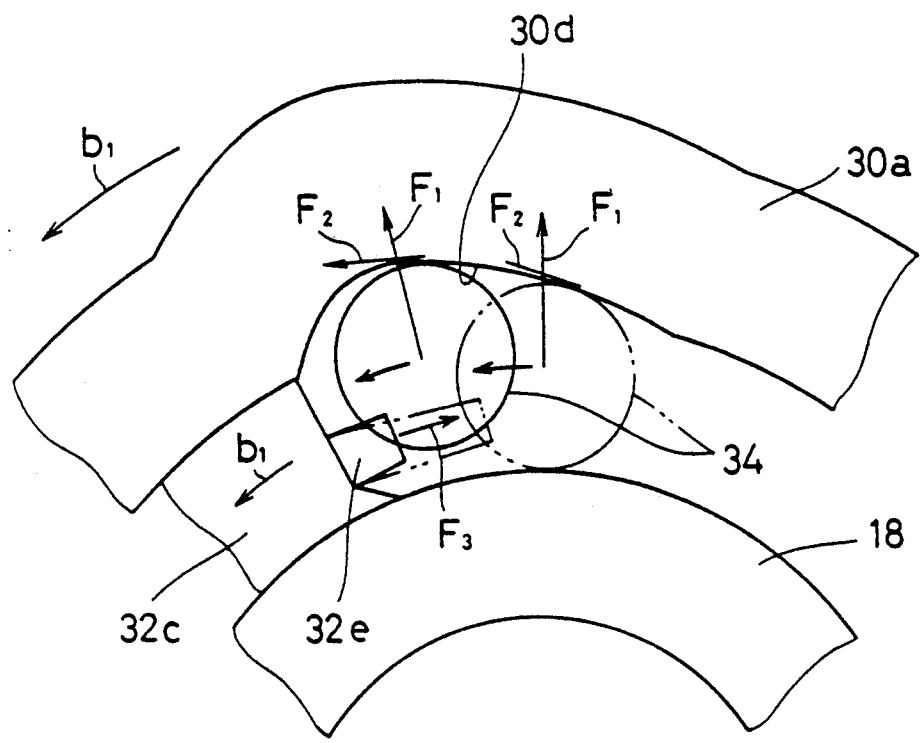
Figure 4:
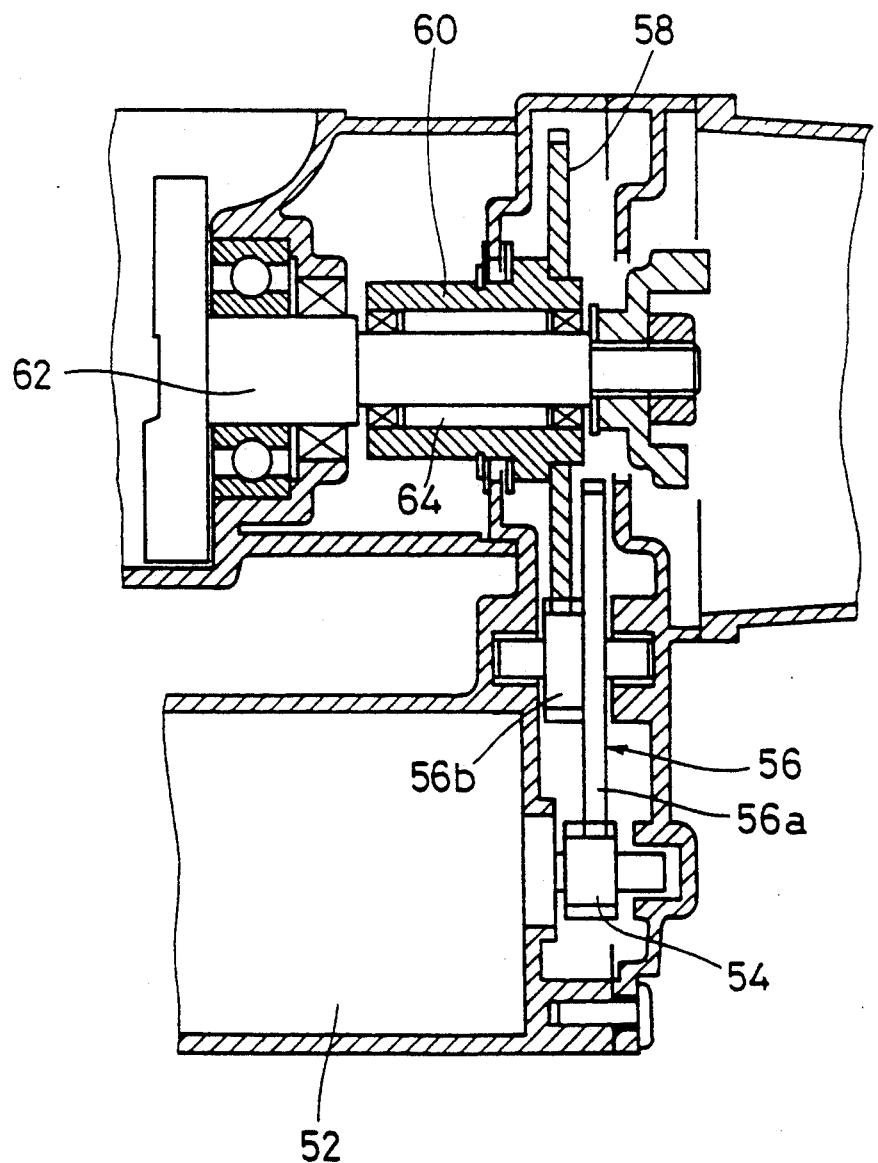
FIGS. 4 to 6 illustrate prior art.
Figure 5:
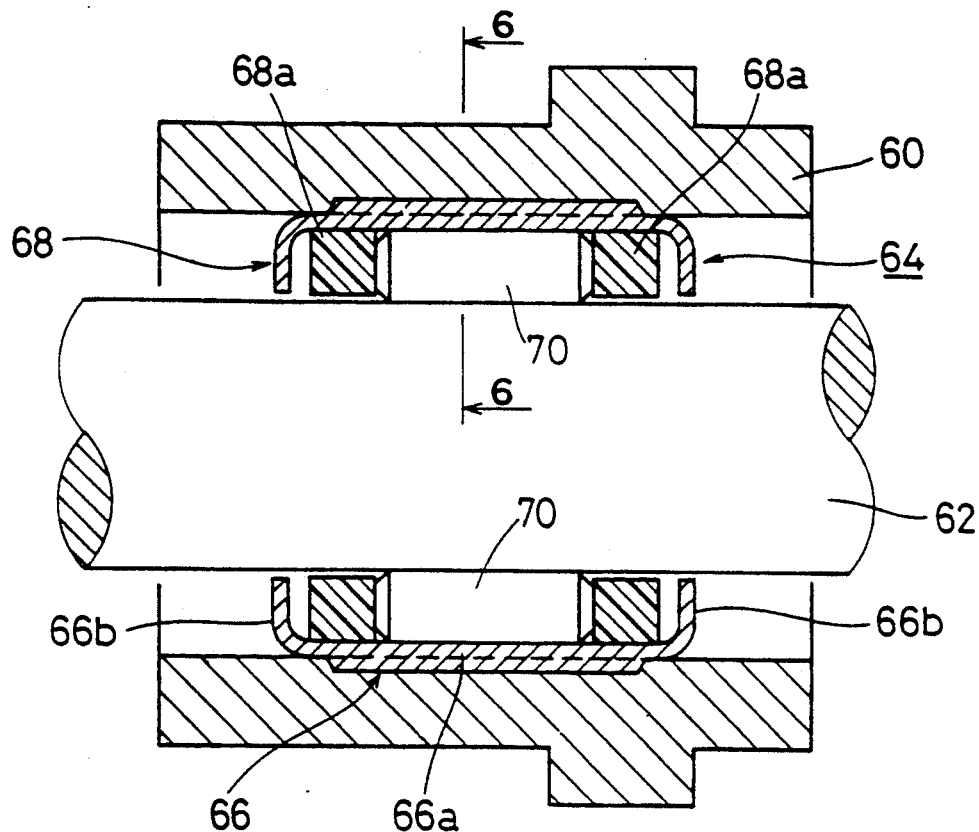
Figure 6:
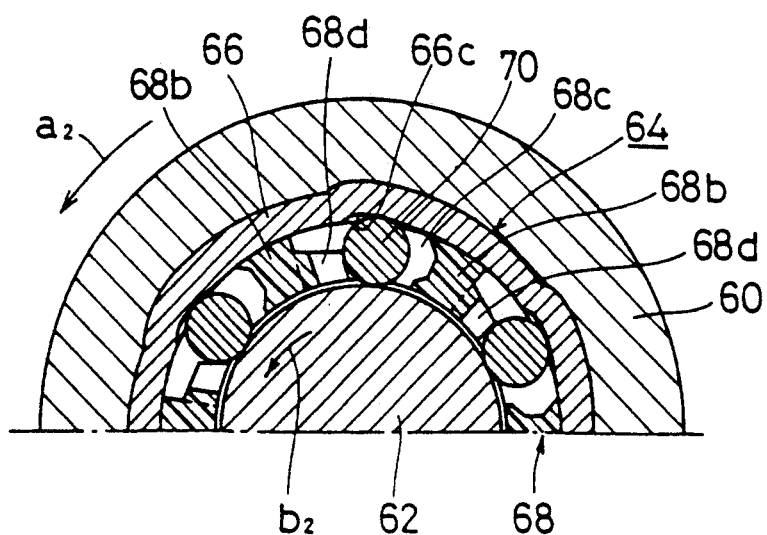
Figure 7:
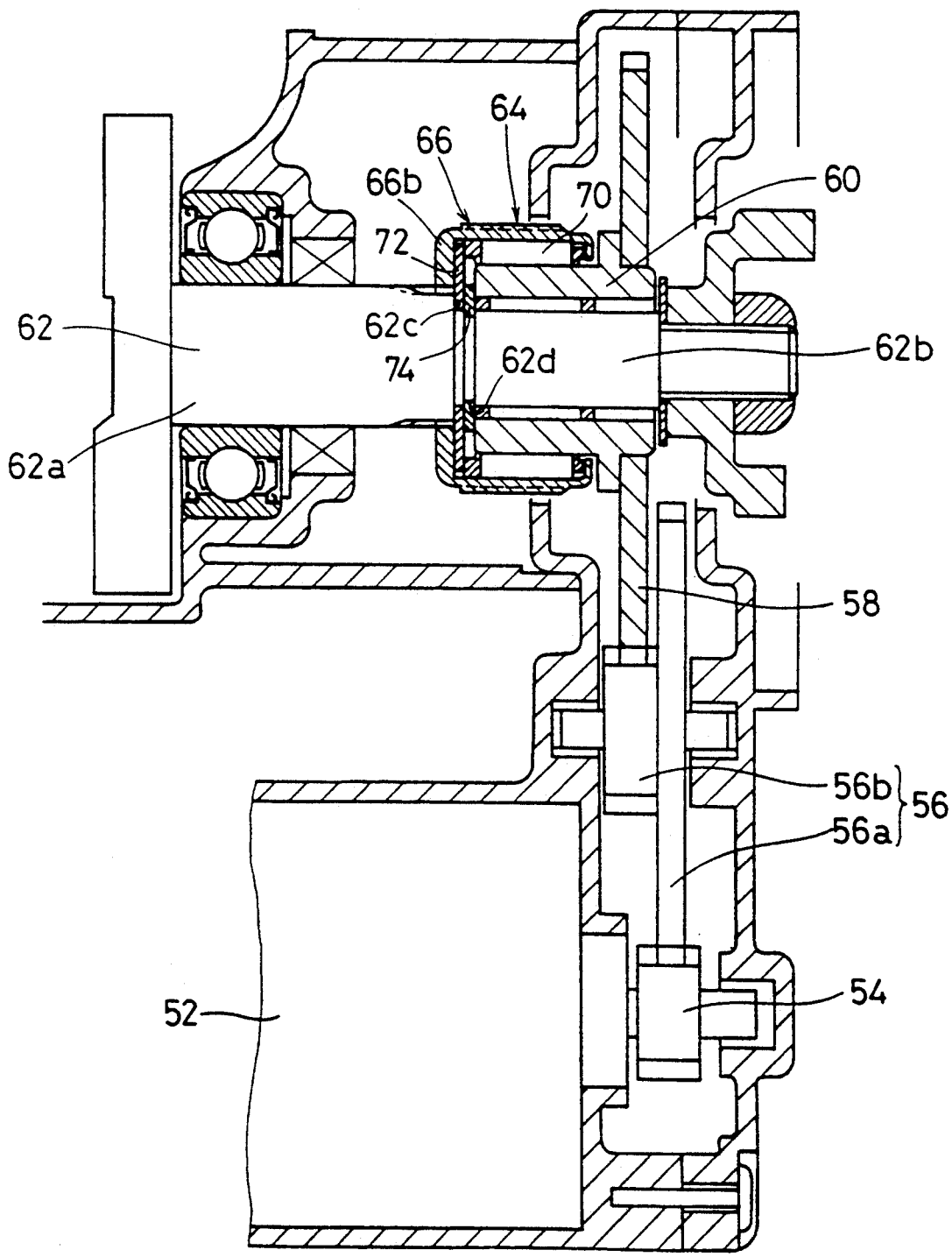
FIG. 7 illustrates a longitudinal sectional side view of an overrunning clutch system proposed to solve the problems of the above conventional overrunning clutch system.

Referring to FIG. 3 in relation to the above free state of the overrunning clutch A, centrifugal force F1, which is produced when the rollers 34 are rotated at a high speed in the direction of the arrow b1, effects the rollers 34. On the other hand, component force F2 is applied to the rollers 34 since the rollers 34 are pressed against the cam surfaces 30d.

Such a cooperation of the centrifugal force F1 and the component force F2 to the rollers 34 causes the rollers 34 to be moved against the action of the springs 32e within the space between the cam surfaces 30d and the transmission sleeve 18 from the narrow position shown by a dotted line to the wide position shown by a solid line. Thus, the rollers 34 are made possible to freely race within the wide space between the cam surfaces 30d and the transmission sleeve 18, resulting in that rotation of the crankshaft 22 and the shell 30 is no longer transmitted to the transmission sleeve 18, and thus the starter motor 10.

Since it is constructed so that the centrifugal force is applied to the rollers 34, a "dancing phenomenon" of the rollers 34 is not caused even when the overrunning clutch A is placed in the free state.

This means that the rollers 34 are not in contact with the outer periphery of the transmission sleeve 18, and it is therefore possible to avoid seizure of the rollers 34 and thermal damage to the retainer 32.

In the illustrated embodiment, the springs 32e are integrally formed together with the retainer 32. Alternatively, the scope of the present invention may be such that the springs 32e are separated from the retainer 32.

The present invention being thus described, it will be obvious that the same may be varied in many ways. Such variations are not to be regarded as a departure from the spirit and scope of the invention, and all such modifications as would be obvious to one skilled art are intended to be included within the scope of the following claims.

What is claimed is:

1. An overrunning clutch system comprising:
    a driven shaft including a large diameter portion, a small diameter portion, and an attaching portion, the large diameter portion having a step formed on the end surface thereof;
    a hollow drive shaft fitted around the small diameter portion of the driven shaft;
    an overrunning clutch for transmitting power from the drive shaft to the driven shaft, the overrunning clutch including a shell, a retainer, a plurality of rollers, springs, and an annular abutment plate, the shell including a cylindrical portion in the inner periphery of which cam surfaces are formed so that a space between the cam surfaces and the driven shaft is narrower in a lock direction and wider in an unlock direction, and a flange radially and inwardly extended from one end of the shell and engaged with the large diameter portion of the driven shaft, the retainer being held in the inner periphery of the cylindrical portion of the shell and having roller pockets corresponding in number to the cam surfaces, the rollers being disposed within corresponding roller pockets to lock the cylindrical portion and the drive shaft when the rollers are moved in the lock direction and to freely race within the roller pockets when the rollers are moved in the unlock direction, the springs being disposed within the roller pockets for urging the rollers in the lock direction, the annular abutment plate being disposed between the inner periphery of the cylindrical portion of the shell and one end surface of the retainer;
    an axially movable sleeve fitted around the small diameter portion of the driven shaft and inside of said hollow drive shaft; and
    a fixing member mounted on the attaching portion of the driven shaft to press an end of said axially movable sleeve toward the step on the large diameter portion of the driven shaft and to hold the annular abutment plate between the one end surface of said axially movable sleeve and the step.

2. The overrunning clutch system as claimed in claim 1, further comprising a roller bearing which is disposed between the outer periphery of said axially movable sleeve and the inner periphery of the drive shaft, and a plurality of rollers which roll on said axially movable sleeve.

3. The overrunning clutch system as claimed in claim 1, wherein the drive shaft is a crankshaft connected to an engine through a crank.

4. The overrunning clutch system as claimed in claim 1, wherein the shell includes a pair of flanges, one of the flanges being axially thicker and radially longer than the other of the flanges, and spline engaged with the large diameter portion of the driven shaft.

5. The overrunning clutch system as claimed in claim 1, wherein the retainer is made of a synthetic resin and integral with the springs.

6. The overrunning clutch system as claimed in claim 1, wherein the attaching portion is threaded, and the fixing member includes a nut which is attached to the attaching portion.

* * * * *